(12) United States Patent
Chen (10) Patent No.: US 10,789,102 B2
(45) Date of Patent: Sep. 29, 2020

(54) RESOURCE PROVISIONING IN COMPUTING SYSTEMS

(71) Applicant: Microsoft Technology Licensing, LLC, Redmond, WA (US)

(72) Inventor: Yingying Chen, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 81 days.

(21) Appl. No.: 16/243,617

(22) Filed: Jan. 9, 2019

(65) Prior Publication Data

US 2020/0218571 A1 Jul. 9, 2020

(51) Int. Cl.
*G06F 9/46* (2006.01)
*G06F 9/50* (2006.01)
*G06N 5/02* (2006.01)
*H04L 12/911* (2013.01)
*H04L 29/08* (2006.01)

(52) U.S. Cl.
CPC ............ *G06F 9/505* (2013.01); *G06F 9/5077* (2013.01); *G06F 9/5083* (2013.01); *G06N 5/02* (2013.01); *H04L 47/70* (2013.01); *H04L 67/1002* (2013.01); *H04L 67/1097* (2013.01); *G06F 2209/505* (2013.01); *G06F 2209/5011* (2013.01)

(58) Field of Classification Search
CPC ...... G06F 9/505; G06F 9/5077; G06F 9/5083; G06F 2209/5011; G06F 2209/505; G06N 5/02; H04L 47/70; H04L 67/1002; H04L 67/1097
See application file for complete search history.

(56) References Cited

U.S. PATENT DOCUMENTS

2018/0302291 A1 * 10/2018 Srinivasan .......... G06F 9/45558

OTHER PUBLICATIONS

"Exponential Smoothing", Retrieved From: https://en.wikipedia.org/w/index.php?title=Exponential_smoothing&oldid=858289816, Sep. 6, 2018, 8 Pages.
"Forecasting: Principles and Practice, Exponential Smoothing", Retrieved From: https://otexts.com/fpp2/expsmooth.html, Retrieved on: Dec. 13, 2019, 2 Pages.
"Mean Absolute Percentage Error", Retrieved From: https://en.wikipedia.org/w/index.php?title=Mean_absolute_percentage_error&oldid=851768235, Jul. 24, 2018, 3 Pages.

* cited by examiner

*Primary Examiner* — Wissam Rashid
(74) *Attorney, Agent, or Firm* — Liang IP, PLLC (57) ABSTRACT

Techniques for automated capacity management in computing systems are disclosed herein. In one embodiment, a method includes generating multiple time series models each representing predicted usage levels of the computing resource based on historical usage levels of the computing resource. The method can then include selecting, from the generated multiple time series models, one of the time series models that has a combined value of a forecast error and a forecast churn smaller than the other generated time series models. The method can further includes determining a future usage level of the computing resource in the computing system at the future time point using the selected one of the time series models and allocating and provisioning an amount of the computing resource in the computing system in accordance with the predicted future usage level of the computing resource at the future time point.

20 Claims, 7 Drawing Sheets

RESOURCE PROVISIONING IN COMPUTING SYSTEMS

BACKGROUND

Cloud computing allows sharing of a pool of computing resources to multiple users via a computer network, such as the Internet. The shared computing resources can include computation, communications, storage, or other computing resources provided by one or more datacenters. In such datacenters, routers, switches, bridges, load balancers, or other network devices interconnect many servers and network storage devices. Individual servers can host virtual machines, containers, virtual switches, or other virtualized components cooperating with one another to provide various cloud services to users.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Implementing cloud services typically involves utilizing remote servers or other suitable hosts interconnected to provide users with application execution, data storage, data retrieval, or other computing services via computer networks. A management controller, such as a fabric controller, a cluster controller, a rack controller, etc., is often utilized to monitor operations of and facilitate functionalities performed by the hosts. For example, a fabric controller can monitor whether a host (or components thereof) is running above a threshold capacity, has failed completely, or having other operational issues. In response to detecting an operating issue with a host, the fabric controller can attempt remedial actions by, for instance, allocating and provisioning additional resources to the host, migrating virtual machines currently on the host to other hosts in the computing system, restarting the host, replacing hardware components of the host, and/or perform other suitable recovery actions.

The foregoing operation control, however, is reactive in nature and may be inadequate to address varying resource demands or usage levels placed on the shared computing resources. For example, users can place different demands on a pool of shared computing resources such as in a cluster, a datacenter, a region, an availability zone, etc. Such user demands can increase or decrease with respect to time because many actions or operations of the users within the shared pool can impact resource capacity available in the pool. For instance, scheduling operations for updating components of the hosts, enforcing usage quota for users, and implementing service offer restrictions can all have an impact on available resource capacity. Due to such variability of user actions, the shared pool of computing resources can be exhausted by high user demands before the management controller can take reactive remedial actions, and thus resulting in service interruptions. In order to at least reduce a risk of such service interruptions, sufficiently accurate prediction or forecast of future user demands and/or usage levels of computing resources may be beneficial to provision enough computing resources before capacity exhaustion of the shared pool of computing resources.

Many techniques exist to predict a future data point such as a future demand or usage level based on historical data. For example, techniques exist to generate a time series model based on time series data with multiple historical data points arranged with respect to time and extrapolate the time series model for future time points. In particular, exponential smoothing is an example forecast technique for predicting a future data point based on historical data points by smoothing time series data using an exponential window function that assigns exponentially decreasing weights over time. Exponential smoothing can be applied as a low-pass filter to remove high frequency noises in the time series data to generate a model representing best estimates of future time point data $\{s_t\}$. In one example, when a raw data sequence is represented by $\{x_t\}$ at time t=0, a simple form of exponential smoothing is given by the following formula:

$$s_0 = x_0$$

$$s_t = \alpha x_t + (1-\alpha) x_{t-1}, t > 0$$

where $\alpha$ is a level smoothing factor ($0 < \alpha < 1$) that represents a number of historical data points used to forecast a level of a future time series value.

The exponential smoothing model $\{s_t\}$ can be optimized based on error measurements between values of actual historical time series data and those obtained from the exponential smoothing model. For instance, the smoothing factor $\alpha$ may be selected to minimize a sum of squared errors (SSE), a mean absolute percentage error (MAPE), a weighted mean absolute percentage error (WMAPE), or other suitable types of error measurements. In other examples, the exponential smoothing model can also be optimized using a slope smoothing factor $\beta$ ($0 < \alpha < 1$) that represents a number of historical data points used to forecast a slope of future time series data.

One limitation of the foregoing approach is that performance of an exponential smoothing model $\{s_t\}$ is optimized for fitting accuracy based on historical time series data but not necessarily for a high forecast accuracy. For example, when a usage forecast is generated once a month (e.g., from April to June) for a future month (e.g., July), a forecast value reported from one month (e.g., June) can be different from another forecast value reported from a previous month (e.g., May). The reason is that in June, the historical time series data has one more actual data point than those from May. As such, the predicted value for July using the extra data point from June can be significantly different than that predicted based on the time series data from May. If the forecast value for July generated at June is significantly higher than that from May, sufficient time may not exist to allocate and provision for the a now higher forecast value for July, and thus service interruptions due to capacity exhaustion may occur in the distributed computing system.

Several embodiments of the disclosed technology provide an automated capacity manager configured to address at least some of the foregoing difficulties by optimizing an exponential smoothing model using a metric referred to herein as a "forecast churn" in addition to an error measurement (e.g., MAPE). The capacity manager can be a part of a management controller, a computing service accessible by the management controller, or a standalone server. In certain implementations, the forecast churn or churn ($\mu$) can be defined as a value that measures a difference between a forecast value for a future time point generated from a time series data having a data point from a recent time period and another forecast value for the same future time point generated from the time series data without the data point from the recent time period, as follows:

$$\text{churn}(\mu) = \{s_{t+n}\}_{t0 \to t} - \{s_{t+n}\}_{t0 \to t+1}$$

where $\{s_{t+n}\}_{t0\to t}$ represents a forecast value generated for a time point t+n based on the time series data from time $t_0$ to t; $\{s_{t+n}\}_{t0\to t+1}$ represent another forecast value generated for the same time point t+n based on the time series data from time $t_0$ to t+1. Thus, in the example time series data above, a forecast churn (μ) is a difference between a forecast value for July based on the time series data including time points up to May and another forecast value for July based on the same time series data including time points up to June. In other implementations, the forecast churn can also be defined as an absolute, negative, or other suitable types of value of the foregoing difference.

In accordance with embodiments of the disclosed technology, a sequence of time series data can be optimized based on both an error measurement (e.g., WMAPE) and a forecast churn (μ). For instance, multiple exponential smoothing model $\{s_t\}$ can be generated by selecting various values of the level and slope smoothing factors α and β, respectively, based on the same time series data $\{x_t\}$. Based on the generated exponential smoothing models $\{s_t\}$, an error measurement (e.g., WMAPE) and forecast churn (μ) can be calculated using actual values of the time series data and those calculated according to the generated exponential smoothing models $\{s_t\}$. In one implementation, values of the error measurement can then be plotted against values of the churn (μ) in a Cartesian coordinate. Based on the plot, a set of level and slope smoothing factors (α', β') can be selected such that a combined value of the error measurement and forecast churn is at or near a minimum (e.g., within 10% of the minimum due to other operational concerns). The combined value of level and slope smoothing factors (α', β') can be selected by, for example, minimizing a simple algebraic combination (e.g., WMAPE+μ), a weighted algebraic combination (e.g., WMAPE×$W_1$+μ×$W_2$, where $W_1$ and $W_2$ are weight factors from zero to one, ten, or other suitable values), or other suitable types of combined value. In other implementations, the level and slope smoothing factors (α', β') can be selected based on updated usage quota to users, service level restrictions, or other suitable factors in addition to or in lieu of the error measurement and the churn.

Upon selecting the level and slope smoothing factors (α', β'), a corresponding exponential smoothing model $\{s_t\}$ can be selected to calculate forecast values for one or more future time points. As such, by optimizing the exponential smoothing model $\{s_t\}$ based on both the error measurement and the forecast churn, a risk of significant variation in forecast values for future time points may be reduced or even eliminated when compared to other exponential smoothing techniques. Thus, in the example above, the forecast value for July generated based on the time series data with a data point from June would not significantly (e.g., more than 10%, 20%, or other suitable percentages) differ from that generated without the data point from June. As such, the management controller of the distributed computing system can more efficiently allocate and provision computing resources for the predicted usage level in July.

Upon obtaining the forecast value for a future time point (e.g., July), in certain embodiments, the capacity manager can be configured to directly trigger various machine actions in the distributed computing system. For example, the capacity manager can provision additional virtual machines, containers, load balancers, or other suitable resources. In another example, the capacity manager can also modify network traffic policies (e.g., bandwidth restrictions) to increase/decrease network bandwidth allocated to certain users. In yet another example, the capacity manager can also send out an alert, for instance, as an email to an administrator to trigger usage quota or offer restriction implementations. In another example, the capacity manager can also trigger expedited built-out of clusters or servers designed to provide the resource type that is indicated to have a capacity shortage. In a further example, the capacity manager can trigger a re-balance of loads between an on-premise cloud computing system and a public cloud computing system. In yet a further example, the capacity manager can perform a risk assessment of service interruption or failure based on an inventory level and a service level agreement with the users and perform remedial actions when the service level agreement is expected to be violated. In further embodiments, the capacity manager can be configured to cause the management controller to perform at least one or more of the foregoing machine actions.

Several embodiments of the disclosed technology can thus improve reliability of cloud services and/or cloud computing systems by reducing a risk of unexpectedly exhausting shared computing resources in distributed computing systems. By using the forecast churn as a factor or criterion to generate a time series model, a large variation in a forecast usage level for a future time point may be avoided. Thus, instead of being unable to accommodate a suddenly high forecast of future usage level, usage of computing resources can be more smoothly predicted and provisioned in the distributed computing system. As such, user experience with the provided cloud services may be enhanced.

DETAILED DESCRIPTION

Certain embodiments of computing systems, devices, components, modules, routines, and processes for automated resource provisioning in distributed computing systems are described below. In the following description, specific details of components are included to provide a thorough understanding of certain embodiments of the disclosed technology. A person skilled in the relevant art can also understand that the disclosed technology may have additional embodiments or may be practiced without several of the details of the embodiments described below with reference to FIGS. 1-8.

As used herein, the term "computing cluster" generally refers to a computer system having a plurality of network devices that interconnect multiple servers or hosts to one another or to external networks (e.g., the Internet). One example of a computing cluster is one or more racks each holding multiple servers in a cloud computing datacenter (or portions thereof) configured to provide cloud services. One or more computing clusters can be interconnected to form a "computing fabric." The term "network device" generally refers to a network communications component. Example network devices include routers, switches, hubs, bridges, load balancers, security gateways, or firewalls. A "host" generally refers to a server or other suitable types of computing device configured to implement one or more virtual machines, virtual routers, virtual gateways, or other suitable virtualized computing components. For example, a host can include a server executing suitable instructions to provide a hypervisor configured to support one or more virtual machines for one or more users or tenants on the same server.

Also used herein, the term "cloud service" or "computing service" generally refers to computing resources provided over a computer network such as the Internet. Common examples of cloud services include software as a service ("SaaS"), platform as a service ("PaaS"), and infrastructure as a service ("IaaS"). SaaS is a software distribution technique in which software applications are hosted by a cloud service provider in, for instance, datacenters, and accessed by users over a computer network. PaaS generally refers to delivery of operating systems and associated services over the computer network without requiring downloads or installation. IaaS generally refers to outsourcing equipment used to support storage, hardware, servers, network devices, or other components, all of which are made accessible over a computer network.

Further, as used herein, the term "computing resource" generally refers to a physical or virtual component of a limited availability within a computing system. In one example, computing resources can include servers, processor cores, or other hardware computing devices or internal components thereof. In another example, computing devices can also host and provide virtual machines, containers, cloud storage spaces, communications bandwidths, or other suitable virtual computing resources. Also, the term "capacity" refers to an amount of a computing resource of certain resource types in a cluster, datacenter, or region that is available to be consumed by users. One example capacity of computing resources can include a number of processors, cores, or virtual machines of certain sizes that can be deployed in a region.

Also used herein, a "time series data" generally refers to a set of data having multiple data points arranged or indexed according to corresponding time points or otherwise with respect to time. Examples of time series can include heights of ocean tides, counts of sunspots, and network bandwidth consumed over a day, week, or month. Various techniques can be used to derive models or time series models based on time series data to predict future values. For example, curve fitting can be used to construct a curve or a mathematic function/model that best fit to a series of data points in time series data. During such curve fitting, a smoothing function, e.g., exponential smoothing, can be applied to fit the curve to the time series data. As used herein, "exponential smoothing" generally refers to a technique for smoothing time series data using an exponential window function. In one example, when a raw data sequence is represented by $\{x_t\}$ at time t=0, a simple form of exponential smoothing is given by the following formula:

$$s_0 = x_0$$

$$s_t = \alpha x_t + (1-\alpha)x_{t-1}, t>0$$

where α is a level smoothing factor ($0<\alpha<1$) that represents a number of historical data points used to forecast a level of a future time series value. In another example, an exponential smoothing is given by the following formula:

$$s_1 = x_1$$

$$b_1 = x_1 - x_0$$

for $t>1$:

$$s_t = \alpha x_t + (1-\alpha)(s_{t-1} + b_{t-1})$$

$$b_t = \beta(s_t - s_{t-1}) + (1-\beta)b_{t-1}$$

where α is the level smoothing factor ($0<\alpha<1$), and β is the slope or trend smoothing factor ($0<\beta<1$).

The exponential smoothing model $\{s_t\}$ can be optimized based on error measurements between values of actual historical time series data and those obtained from the exponential smoothing model. For instance, the smoothing factor α may be selected to minimize a sum of squared errors (SSE), a mean absolute percentage error (MAPE), a weighted mean absolute percentage error (WMAPE), or other suitable types of error measurements. In other examples, the exponential smoothing model can also be optimized using a slope smoothing factor β ($0<\alpha<1$) that represents a number of historical data points used to forecast a slope of future time series data.

Further used herein, a forecast churn or churn (μ) can be defined as a value that measures a difference between a forecast value for a future time point generated from a time series data having a data point from a recent time period and another forecast value for the same future time point generated from the time series data without the data point from the recent time period, as follows:

$$\text{churn}(\mu) = \{s_{t+n}\}_{t0 \to t} - \{s_{t+n}\}_{t0 \to t+1}$$

where $\{s_{t+n}\}_{t0 \to t}$ represents a forecast value generated for a time point t+n based on the time series data from time $t_0$ to t; $\{s_{t+n}\}_{t0 \to t+1}$ represent another forecast value generated for the same time point t+n based on the time series data from time $t_0$ to t+1.

Implementing cloud computing services typically involves utilizing many shared computing resources to provide application execution, data storage, data retrieval, or other suitable computing operations to many users. During operation, various conditions and actions by the users can impact an available capacity of the shared computing resources. In certain cloud computing systems, such conditions and actions can result in exhaustion of the available capacity of the computing resource. Such exhaustion can cause service outages and negatively impact user experience.

Several embodiments of the disclosed technology can apply a forecast churn as a factor when predicting usage levels of computing resources in near future. Based on the predicted usage levels, suitable amount of computing resources can be allocated and provisioned to accommodate variations in user demands. By using the forecast churn in addition to or in lieu of one or more error measurements, variations of predicted future usage levels may be reduced to allow efficient and ready provisioning of such computing resources, as described in more detail below with reference to FIGS. 1-8. Even though the utilization of forecast churn is described below in the context of a distributed computing system, embodiments of the disclosed techniques can also be utilized in a single computer or other suitable types of computing systems.

Figure 1:
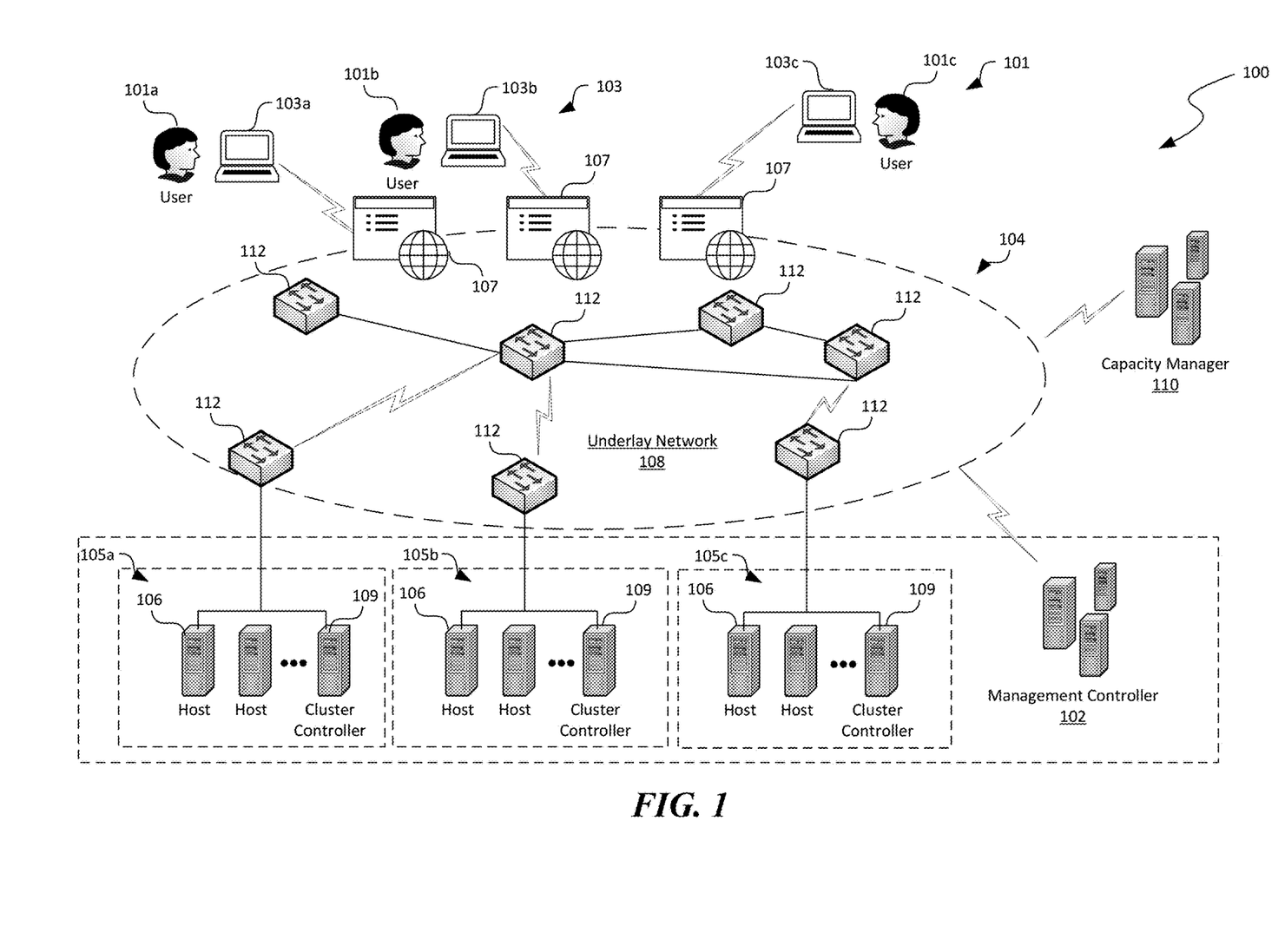
FIG. 1 is a schematic diagram of a distributed computing system implementing automated resource provisioning in accordance with embodiments of the disclosed technology.

FIG. 1 is a schematic diagram illustrating a distributed computing system 100 implementing automated resource provisioning in accordance with embodiments of the disclosed technology. As shown in FIG. 1, the distributed computing system 100 can include an underlay network 108 interconnecting a plurality of client devices 103 (shown as first, second, and third client devices 103a-103c, respectively) of corresponding users 101 (shown as first, second, and third user 101a-101c, respectively), a computing fabric 104, and a capacity manager 110. Even though particular components are shown in FIG. 1, in other embodiments, the distributed computing system 100 can also include additional and/or different constituents. For example, the distributed computing system 100 can include network storage devices, utility infrastructures, and/or other suitable components in addition to or in lieu of those shown in FIG. 1.

The client devices 103 can each include a computing device that facilitates corresponding users 101 to access cloud services provided by the hosts 106 via the underlay network 108. For example, in the illustrated embodiment, the client devices 103 individually include a desktop computer. In other embodiments, the client devices 103 can also include laptop computers, tablet computers, smartphones, or other suitable computing devices. Even though two users 101 are shown in FIG. 1 for illustration purposes, in other embodiments, the distributed computing system 100 can facilitate any suitable number of users 101 to access suitable types of cloud computing services provided by the hosts 106.

As shown in FIG. 1, the underlay network 108 can include one or more physical network devices 112 that interconnect the client devices 103, the computing fabric 104, and the capacity manager 110. Examples of the network devices 112 can include routers, switches, firewalls, load balancers, or other suitable network components. Even though particular connection scheme is shown in FIG. 1 for illustration purposes, in other embodiments, the network devices 112 can be operatively coupled in a hierarchical, flat, "mesh," or other suitable topologies.

The computing fabric 104 can include a management controller 102 and a plurality of hosts 106 operatively coupled to one another by the network devices 112. In certain embodiments, the hosts 106 can individually include a physical server or a computing blade having several physical servers. In other embodiments, the hosts 106 can also include one or more physical servers with multiple processor cores, or other suitable types of computing devices.

The hosts 106 can be organized into racks, availability zones, groups, sets, computing clusters, or other suitable divisions. For example, in the illustrated embodiment, the hosts 106 are grouped into three computing clusters 105 (shown individually as first, second, and third computing clusters 105a-105c, respectively), which are operatively coupled to corresponding network devices 112 in the underlay network 108. Even though three computing clusters 105 are shown in FIG. 1 for illustration purposes, in other embodiments, the computing fabric 104 can include one, two, eight, sixteen, or any other suitable numbers of computing clusters 105 with similar or different components and/or configurations.

Each cluster 105 can also include a cluster controller 109 configured to monitor status and manage operations of the hosts 106 in the corresponding computing cluster 105. For example, the cluster controller 109 can monitor whether a host 106 or components thereof has failed. In response to detecting a failure of the host 106 or components thereof, the cluster controller 109 can attempt to remedy the detected failure by, for instance, migrating virtual machines hosted on the failed host 106 to other hosts 106 in the same cluster 105, restarting the failed host 106, replacing hardware components of the failed host 106, and/or perform other suitable operations. Though the cluster controllers 109 are shown as separate physical servers in FIG. 1, in other embodiments, the cluster controllers 109 can also include computing services provided by one or more of the hosts 106 in corresponding computing clusters 105.

The management controller 102 can be configured to monitor, control, or otherwise manage operations of the computing clusters 105. For example, in certain embodiments, the management controller 102 can include a fabric controller configured to manage processing, storage, communications, or other suitable types of hardware resources in the computing clusters 105 for hosting desired computing services. In other embodiments, the management controller 102 can also include a datacenter controller, application delivery controller, or other suitable types of controller. In the illustrated embodiment, the management controller 102 is shown as being separate from the computing clusters 105. In other embodiments, the management controller 102 can include one or more hosts 106 in the computing clusters 105. In further embodiments, the management controller 102 can include software services hosted on one or more of the hosts 106 in the computing clusters 105.

The capacity manager 110 can be configured to predict future usage levels of various computing resources in the distributed computing system 100 by utilizing forecast churn as a factor. For example, the capacity manager 110 can receive historical and/or current usage data of various computing resources and predict based thereon, future demand or usage levels for the various computing resources. Based on the predicted future demand or usage levels, the capacity manager 110 can determine a type and an amount of computing resources to be allocated and provisioned in the distributed computing system 100. The capacity manager 110 can also be configured to trigger various machine actions for accommodating the predicted future usage levels. Example remedial actions can include prioritizing out-for-repair hosts 106 that are designed to provide the type of computing resources or other suitable actions.

Even though the capacity manager 110 is shown in FIG. 1 as a separate component from the management controller 102 and the hosts 106 of the distributed computing system 100, in other embodiments, certain functionalities of the capacity manager 110 can a part of the management controller 102 or one or more of the cluster controllers 109. In further embodiments, other functionalities of the capacity manager 110 can also be provided as one or more computing services hosted on one or more of the hosts 106 in the computing fabric 104. Certain example components of the capacity manager 110 and details of operations are described in more detail below with reference to FIGS. 3-6.

In operation, the users 101 can request various computing services (e.g., deployment of a site) or computing resources (e.g., network bandwidth) via, for example, user portals 107 on corresponding client devices 103. In response, the management controller 102 can allocate one or more hosts 106 or other computing resources to execute suitable instructions to provide the requested computing services. Once allocated, the computing resources may be unavailable to other users 101 until the requested computing services have been terminated. As such, available capacity of various computing resources can fluctuate in the distributed computing system 100. In certain situations, the computing resources may be exhausted such that the request from the users 101 for computing services would fail. Such failures can negatively impact user experience of the computing services.

Unlike in other computing systems, several embodiments of the distributed computing system 100 can predict and proactively provision for various computing resources in the distributed computing system 100. For example, the capacity manager 110 can predict a usage level for virtual machines 144 (shown in FIG. 2) and proactively provision for and deploying additional virtual machines 144 on the host 106 to accommodate the predicted future usage levels. In another example, the capacity manager 110 can also trigger expedited build-out of additional hosts 106 in the computing clusters 105. As such, service interruptions to the users 101 due to capacity exhaustion can be reduced when compared to reactive remedial techniques, as described in more detail below with reference to FIGS. 2-6.

Figure 2:
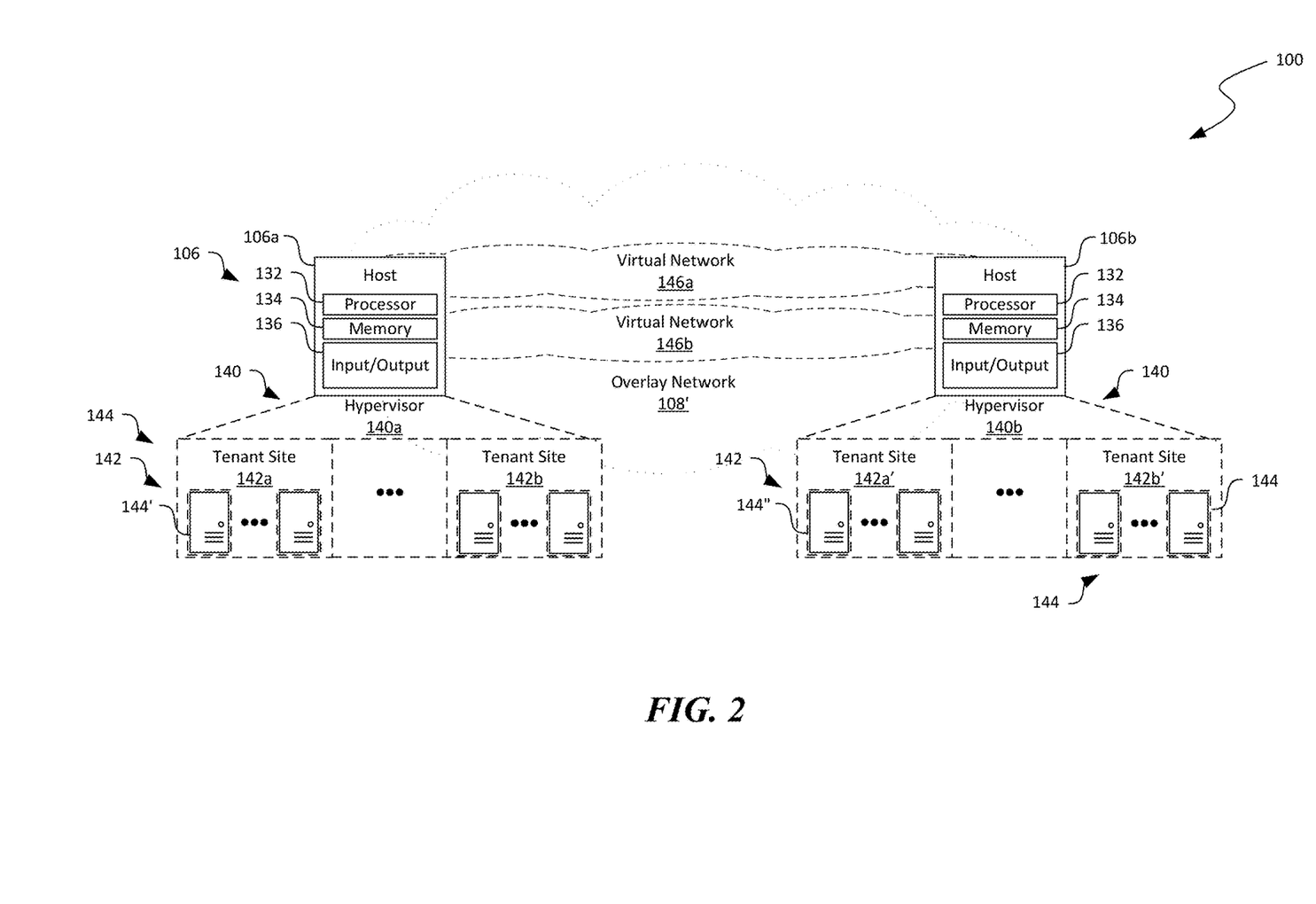
FIG. 2 is a schematic diagram illustrating certain hardware/software components of the distributed computing system of FIG. 1 in accordance with embodiments of the disclosed technology.

FIG. 2 is a schematic diagram illustrating certain hardware/software components of the distributed computing system 100 of FIG. 1 in accordance with embodiments of the disclosed technology. In FIG. 2, only certain components of the distributed computing system 100 of FIG. 1 are shown for clarity. As shown in FIG. 2, the first host 106a and the second host 106b can each include a processor 132, a memory 134, and an input/output component 136 operatively coupled to one another. The processor 132 can include a microprocessor, a field-programmable gate array, and/or other suitable logic devices. The memory 134 can include volatile and/or nonvolatile media (e.g., ROM; RAM, magnetic disk storage media; optical storage media; flash memory devices, and/or other suitable storage media) and/or other types of computer-readable storage media configured to store data received from, as well as instructions for, the processor 132 (e.g., instructions for performing the methods discussed below with reference to FIGS. 7A-7C). The input/output component 136 can include a network interface card or other suitable types of input/output devices configured to accept input from and provide output to an operator and/or an automated software controller (not shown).

The memory 134 of the first and second hosts 106a and 106b can include instructions executable by the corresponding processors 132 to cause the individual hosts 106 to provide a hypervisor 140 (identified individually as first and second hypervisors 140a and 140b) and other suitable virtual components such as virtual network interface card, virtual switches, etc. (not shown). The hypervisors 140 can individually be configured to initiate, monitor, terminate, and/or otherwise locally manage one or more virtual machines 144 organized into tenant sites 142. For example, as shown in FIG. 2, the first host 106a can provide a first hypervisor 140a that manages first and second tenant sites 142a and 142b, respectively, for the same or different tenants or users 101 (FIG. 1). The second host 106b can provide a second hypervisor 140b that manages first and second tenant sites 142a' and 142b', respectively.

The hypervisors 140 can be software, firmware, or hardware components. The tenant sites 142 can each include multiple virtual machines 144 or other suitable tenant instances for a tenant. For example, the first host 106a and the second host 106b can both host the tenant site 142a and 142a' for a first user 101a. The first host 106a and the second host 106b can both host the tenant site 142b and 142b' for a second user 101b (FIG. 1). Each virtual machine 144 can be executing a corresponding operating system, middleware, and/or applications.

Also shown in FIG. 2, the distributed computing system 100 can include one or more virtual networks 146 that interconnect the tenant sites 142a and 142b across multiple hosts 106. For example, a first virtual network 142a interconnects the first tenant sites 142a and 142a' at the first host 106a and the second host 106b. A second virtual network 146b interconnects the second tenant sites 142b and 142b' at the first host 106a and the second host 106b. Even though a single virtual network 146 is shown as corresponding to one tenant site 142, in other embodiments, multiple virtual networks 146 (not shown) may be configured to correspond to a single tenant site 146.

The virtual machines 144 on the virtual networks 146 can communicate with one another via the underlay network 108 (FIG. 1) even though the virtual machines 144 are located on different hosts 106. Communications of each of the virtual networks 146 can be isolated from other virtual networks 146. In certain embodiments, communications can be allowed to cross from one virtual network 146 to another through a security gateway or otherwise in a controlled fashion. A virtual network address can correspond to one of the virtual machines 144 in a virtual network 146. Thus, different virtual networks 146 can use one or more virtual network addresses that are the same. Example virtual network addresses can include IP addresses, MAC addresses, and/or other suitable addresses.

Figure 3:
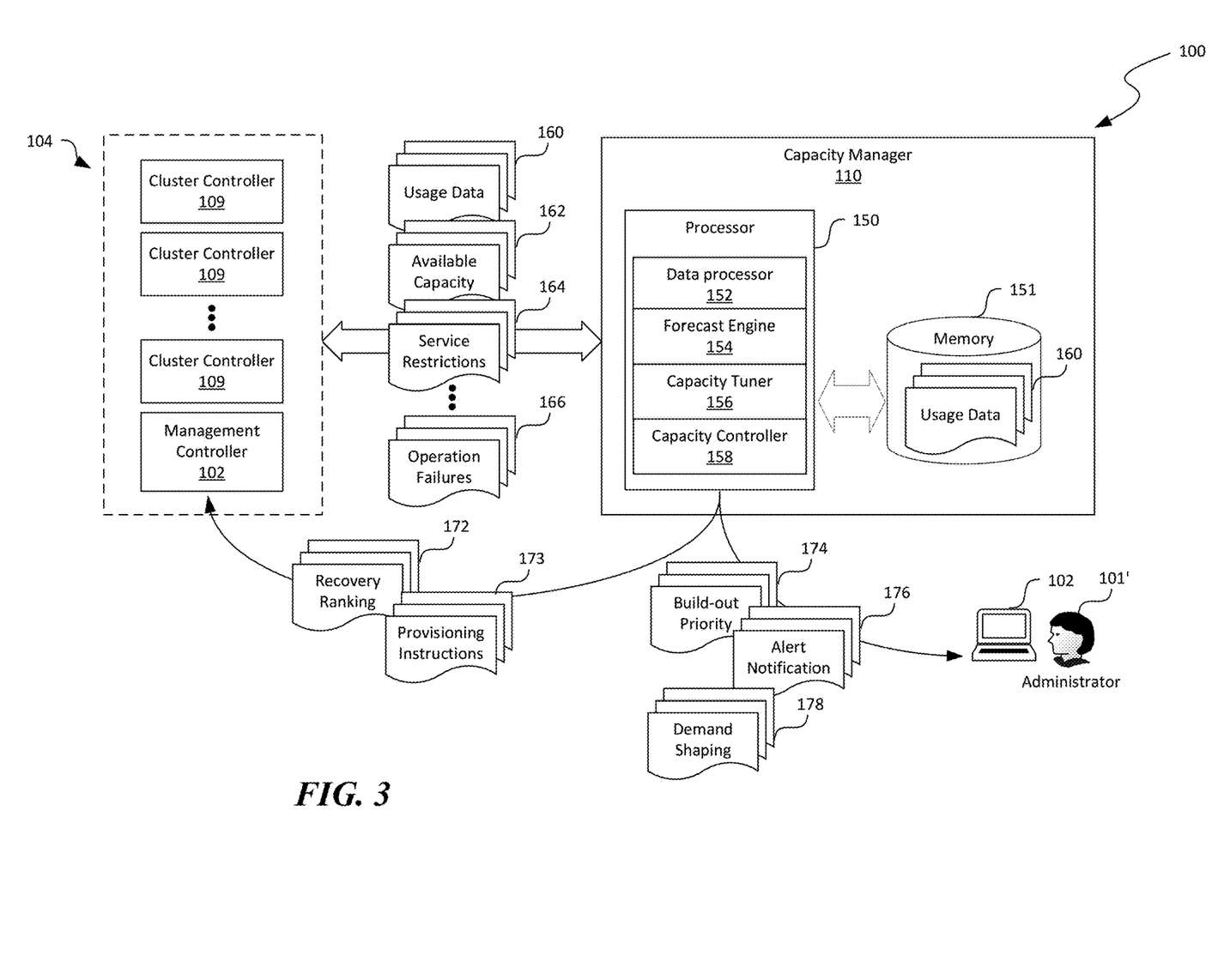
FIG. 3 is a schematic diagram illustrating certain hardware/software components of a capacity manager in the distributed computing system in accordance with embodiments of the disclosed technology.

FIG. 3 is a schematic diagram illustrating certain hardware/software components of a capacity manager 110 in the distributed computing system 100 of FIG. 1 in accordance with embodiments of the disclosed technology. In FIG. 3, certain hardware/software components of the distributed computing system 100 are omitted for clarity. For example, only the management controller 102 and the cluster controllers 109 are shown in FIG. 3 as the computing fabric 104 for illustration purposes. The hosts 106 are not shown in FIG. 3.

In addition, in FIG. 2 and in other Figures herein, individual software components, objects, classes, modules, and routines may be a computer program, procedure, or process written as source code in C, C++, C #, Java, and/or other suitable programming languages. A component may include, without limitation, one or more modules, objects, classes, routines, properties, processes, threads, executables, libraries, or other components. Components may be in source or binary form. Components may include aspects of source code before compilation (e.g., classes, properties, procedures, routines), compiled binary units (e.g., libraries, executables), or artifacts instantiated and used at runtime (e.g., objects, processes, threads). In certain embodiments, the various components and modules described below can be implemented with actors. In other embodiments, generation of the application and/or related services can also be implemented using monolithic applications, multi-tiered applications, or other suitable components.

Components within a system can take different forms within the system. As one example, a system comprising a first component, a second component and a third component can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a network server, a laptop computer, a smartphone, and/or other suitable computing devices. Equally, components may include hardware circuitry.

A person of ordinary skill in the art would recognize that hardware may be considered fossilized software, and software may be considered liquefied hardware. As just one example, software instructions in a component may be burned to a Programmable Logic Array circuit or may be designed as a hardware circuit with appropriate integrated circuits. Equally, hardware may be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media excluding propagated signals.

As shown in FIG. 3, the capacity manager 110 can include a processor 150 and a memory 151 operatively coupled to one another. The processor 150 can include a microprocessor, a field-programmable gate array, and/or other suitable logic devices. The memory 151 can include volatile and/or nonvolatile media (e.g., ROM; RAM, magnetic disk storage media; optical storage media; flash memory devices, and/or other suitable storage media) and/or other types of computer-readable storage media configured to store data received from, as well as instructions for, the processor 150. In the illustrated embodiment, the processor 150 can be configured to execute instructions from, for instance, the memory 151 to provide a data processor 152, a forecast engine 154, a capacity tuner 156, and a capacity controller 158 operatively coupled to one another. In other embodiments, the processor 150 can also execute suitable instructions to provide an interface component, a network component, or other suitable types of component (not shown).

The data processor 152 can be configured to receive and process various data from different components of the computing fabric 104. For example, as shown in FIG. 3, the data processor 152 can receive data representing usage levels (shown as "usage data" 160) of certain types of computing resources (e.g., deployed virtual machines 144 in FIG. 2), data representing available capacity 162 of types of computing resources (e.g., allocable capacity of virtual machines of certain sizes), data representing service restrictions 164 currently implemented in the computing fabric 104, and indications of operation failures 166 (e.g., failures to deploy a requested virtual machine of a certain size) from the cluster controllers 109 and/or the management controller 102. In other embodiments, the data processor 152 can also receive data representing information about out-for-repair hosts 106 (FIG. 1), capacity reservations, upcoming new cluster 105 (FIG. 1), or other suitable types of data from the hosts 106 or other suitable components of the computing fabric 104.

In certain embodiments, the data processor 152 can be configured to query the cluster controllers 109, the fabric controller 102, or other suitable components of the distributed computing system 100 for the various types of data. In other embodiments, the data processor 152 can attempt to instantiate an instance of a resource type (e.g., a virtual machine 144) and determine how many instances may have been provided in the shared pool. In further embodiments, the data processor 152 can determine the currently used and/or available resources in other suitable manners. The data processor 152 can also store the received data from the computing fabric 104 in the memory 151 or other suitable storage locations. Though only the usage data 160 are shown as being stored in the memory 151, any other types of received data can be similarly stored in addition to or in lieu of the usage data 160.

The data processor 152 can also be configured to sort, filter, interpolate, extrapolate, or perform other suitable data operations on the received data from the computing fabric 104. The received data from the computing fabric 104 can have large variances or even missing data points. For example, the usage data 160 of virtual machines 144 (FIG. 2) can fluctuate in the computing fabric 104 as a function of time of day or other parameters. As such, the usage data 160 may indicate high usage levels during working hours and virtually no usage during nights. To address such large variances, the data processor 152 can be configured to aggregate the received usage data 160 on, for instance, an hourly basis, a daily basis, or a weekly basis in order to obtain a suitable data set for analysis by the forecast engine 154.

The forecast engine 154 is configured to receive the processed data set of the usage data 160 from the data processor 152 and generate a future usage level for a type of computing resources based on the received data set. In certain embodiments, the forecast engine 154 can be configured to determine a correlation between the usage level as a function of time using curve fitting, function approximation, autoregressive integrated moving average, or other suitable techniques. In one example, the forecast engine 154 can be configured to apply exponential smoothing during curve fitting of the received data set to generate a time series model for the usage data 160. Based on the generated time series model, the forecast engine 154 can then extrapolate future usage levels for the computing resources for future time points. Example components of the forecast engine 154 are described below in more detail with reference to FIG. 4.

In accordance with embodiments of the disclosed technology, during curve fitting, the applied exponential smoothing can be optimized or otherwise manipulated not only according to an error measurement (e.g., MAPE) but also according to a forecast churn associated with the developed time series model. For example, a set of model parameters, e.g., level and/or slope smoothing factors, can be selected such that a combined value of an error measurement and the forecast churn of a resulting time series model is smaller than other time series models corresponding to other values of the level and/or slope smoothing factors. In other examples, the set of model parameters can also be selected when the combined value of the error measurement and the forecast churn is lower than a threshold, or in other suitable manners. Example time series models and associated model parameters are described in more detail below with reference to FIGS. 5 and 6.

As shown in FIG. 3, the capacity manager 110 can also include a capacity tuner 156 configured to adjust the predicted future usage levels from the forecast engine 154 based on, for example, service restrictions 164, operation failures 166, and/or other suitable conditions impacting computing resources in the computing fabric 104. For example, the service restrictions 164 can contain data representing an offer restriction of, for instance, virtual machines 144 of a certain size. As such, a corresponding usage level for the type of virtual machines is artificially decreased by disallowing users 101 to deploy resources of such a resource type. Thus, the predicted future usage level based on artificially decreased historical usage levels may not reflect actual demand for such resources. To account for the offer restriction, the capacity tuner 156 can be configured to increase, decrease, or otherwise adjusted the predicted future usage levels from the forecast engine 154 based on, for instance, another usage level in a similar computing fabric (not shown) that does not have such offer restriction imposed. In other embodiments, the capacity tuner 156 can also be configured to adjust the predicted future usage levels by applying factors, offsets, or other suitable adjustments based on usage quota approval, indication of previous allocation failures or other suitable operating conditions. In further embodiments, the capacity tuner 156 may be omitted.

Based on the predicted future usage levels from the forecast engine 154 and/or the capacity tuner 156, the capacity controller 158 can be configured to determine whether additional computing resources may be allocated and provisioned to accommodate the future usage levels. For example, the capacity controller 158 can be configured to determine whether a capacity shortage of the type of computing resources is likely to occur in the computing fabric 104 based on the predicted future usage levels. In certain embodiments, the capacity controller 158 can be configured to determine current and/or future inventory levels of computing resources in terms of, for instance, a number of days/weeks/months after which the currently available resources would be exhausted at a current or future time points. The capacity controller 158 can then compare the determined inventory level to the predicted future usage levels to determine whether a capacity shortage would likely occur soon. For example, if a virtual machine of a certain size has an inventory level (e.g., seven days) that is less than a corresponding predicted future usage level (e.g., ten days), the capacity controller 158 can indicate that a capacity shortage of virtual machine of that size would likely occur at a future time point corresponding to the future usage level.

Upon indicating that a capacity shortage is likely to occur at the future time point, the capacity controller 158 can be configured to trigger various remedial actions. For example, as shown in FIG. 3, the capacity controller 158 can be configured to generate an alert notification 176 (e.g., via email) to an administrator 101'. The capacity controller 158 can also be configured to generate a signal of build-out priority 174 that expedites installation of hosts 106 (FIG. 1) or other suitable components of the distributed computing system 100 that are designed to provide the type of computing resources.

In certain embodiments, the capacity controller 158 can further be configured to generate another signal of recovery ranking 172 for out-for-repair hosts 106 and/or provisioning instructions 173 to be transmitted to, for instance, the management controller 102. In turn, the management controller 102 and/or the cluster controllers 109 can prioritize repair of out-for-repair hosts 106 designed to provide the type of computing resources and/or allocate and provision additional computing resources to accommodate the predicted future usage levels. Thus, capacity of the type of computing resources likely to experience capacity shortage may be increased to avoid exhaustion of the computing resources at the future time point. In other embodiments, the capacity manager 110 can be configured to perform the foregoing recovery, allocation, and/or provisioning operations directly instead of the management controller 102.

In further embodiments, the capacity controller 158 can be configured to generate a signal representing demand shaping 178. For example, if the computing fabric 104 cannot be expanded due to space or other constraints, the capacity controller 158 can be configured to generate offer restrictions that prevent the users 101 from requesting the type of computing resources likely to experience capacity shortage. In yet further embodiments, the capacity controller 158 can be configured to perform a rebalance of load distributions between, for example, an on-premise cloud computing system and a public cloud computing system by shifting compute loads therebetween.

Several embodiments of the disclosed technology can thus improve reliability of cloud services provided by the computing fabric 104. By continuously monitoring for potential inventory shortages of various types of computing resources based on predicted future usage levels, a risk of unexpectedly exhausting computing resources in the distributed computing systems 100 can be reduced. In addition, by using the forecast churn as a factor or criterion to generate a time series model, a large variation in a forecast usage level for a future time point may be avoided. Thus, instead of being unable to accommodate a suddenly high forecast of future usage level, usage of computing resources can be more smoothly predicted and provisioned in the distributed computing system 100. As such, user experience with the provided cloud services may be enhanced.

Figure 4:
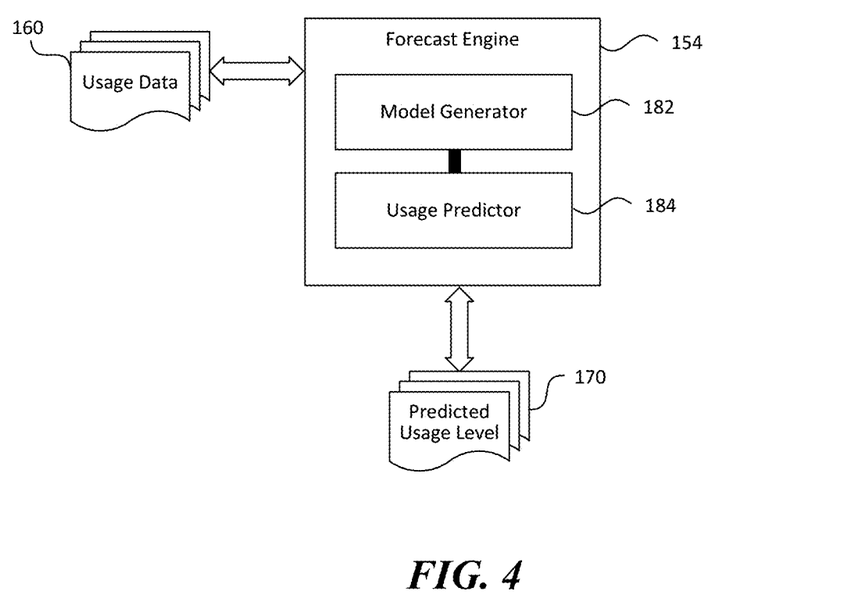
FIG. 4 is a schematic diagram illustrating a forecast engine suitable for the capacity manager in FIG. 3 in accordance with embodiments of the disclosed technology.

FIG. 4 is a schematic diagram illustrating a forecast engine 154 suitable for the capacity manager 110 in FIG. 3 in accordance with embodiments of the disclosed technology. As shown in FIG. 4, the forecast engine 154 can include a model generator 182 and a usage predictor 184 operatively coupled to one another. The model generator 182 can be configured to generate a time series or other suitable types of model of the usage data 160 (FIG. 3). One example technique for generating a model using exponential smoothing is described below with reference to FIG. 7C. Based on the generated time series model, the usage predictor 184 can be configured to predict a future usage level of a type of computing resources by, for example, extrapolating the generated time series model. The usage predictor 184 can then provide the predicted usage level 170 to, for instance, the capacity tuner 156 in FIG. 3 for further processing.

Figure 5:
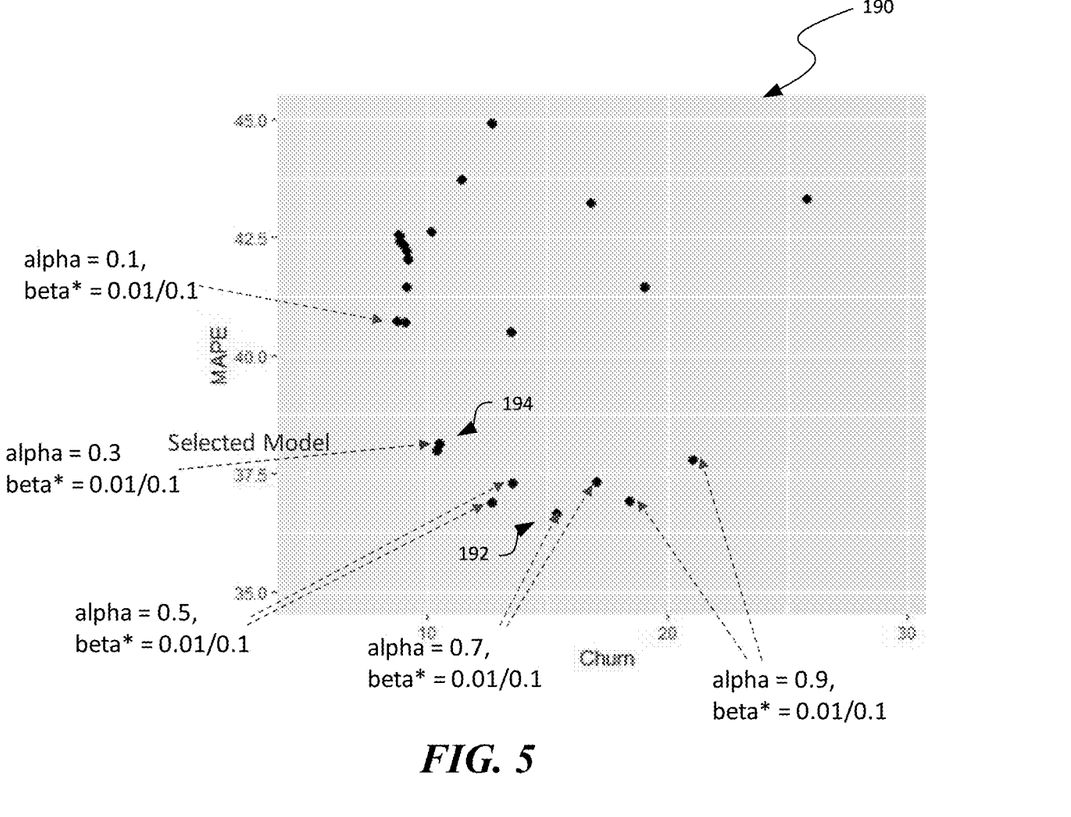
FIG. 5 is an example of error measurement (e.g., MAPE) versus forecast churn plot in accordance with embodiments of the disclosed technology.

FIG. 5 is an example error measurement (e.g., MAPE) versus forecast churn plot illustrating prediction of future usage levels in accordance with embodiments of the disclosed technology. As shown in FIG. 5, the plot 190 can include multiple data points that individually represent error measurement (e.g., MAPE) and forecast churn of individual time series models generated using various combinations of level and slope smoothing factors (i.e., "alpha" and "beta") on the same example historical usage data 160 (FIG. 3) via exponential smoothing. As clearly shown in FIG. 5, the error measurement, MAPE, ranges from about 36.2% to about 45.0% while the forecast churn ranges from about 8% to about 26%.

In certain implementations, only an error measurement, e.g., SSE is used for optimizing the time series models. As such, if only an error measurement is used as a factor for optimization, the example time series model 192 corresponding to an alpha value of 0.7 and a beta value of 0.01 would be selected. However, the time series model 192 would have a relatively large forecast churn of about 16%. Such a large forecast churn can cause a predicted future usage level to suddenly increase or decrease when one or more additional data points are used in the historical usage levels to regenerate the time series model 192. The sudden increase or decrease can cause difficulties in capacity planning in a computing system. For example, large variations in forecast demand can cause confusion as to how much the future demand would actually be. Sudden increases in a forecast demand may over project actual demand, and thus lead to excessive and wasteful deployment of hardware or software. Sudden decreases in a forecast demand may indicate an underestimation of the actual future demand, and thus increasing a risk of exhausting the computing resources.

Figure 6:
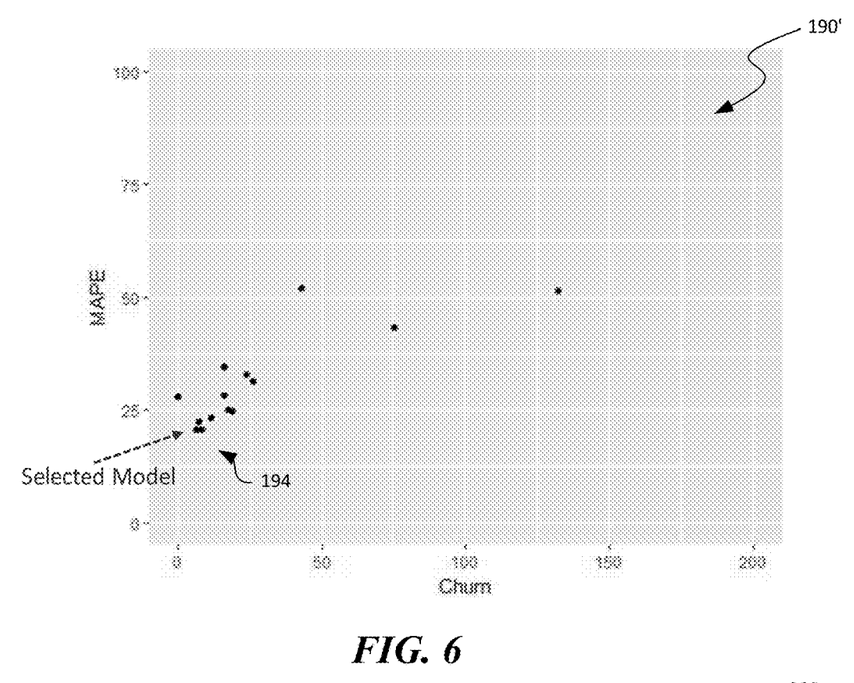
FIG. 6 is another example of error measurement (e.g., MAPE) versus forecast churn plot in accordance with embodiments of the disclosed technology.

According to certain embodiments of the disclosed technology, the error measurement (e.g., MAPE) is used in combination with the forecast churn to optimize or select a time series model for predicting the future usage levels. For instance, a linearly or otherwise combined value of the MAPE and the forecast churn can be used as a criterion for selecting one of the time series models. Thus, in the example shown in FIG. 5, the time series model 194 corresponding to an alpha value of 0.3 and a beta value of 0.01 or 0.1 can be selected for having a combined value smaller than the time series model 192 and other time series models in the plot 190. The selected time series model 194 can be used to generate predicted future usage levels with a reduced churn of about 10%. However, neither the MAPE nor the forecast churn of the selected time series model 192 is the smallest amongst all the time series models in the plot 190. FIG. 6 is another example of error measurement (e.g., MAPE) versus forecast churn plot generated by applying a time series model to a different set of time series data in accordance with embodiments of the disclosed technology. In the illustrated example in FIG. 6, the selected model 194 has both the smallest MAPE and the smallest forecast churn of all the time series models shown in the plot 190.

Figure 7A:
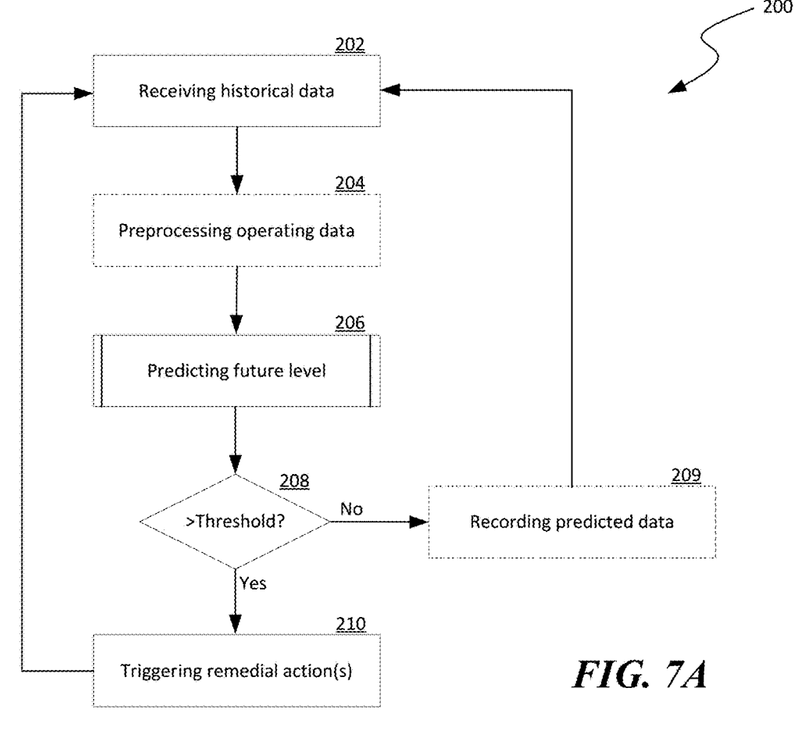
FIGS. 7A-7C are flowcharts illustrating various processes of automated resource provisioning in a distributed computing system in accordance with embodiments of the disclosed technology.
Figure 7B:
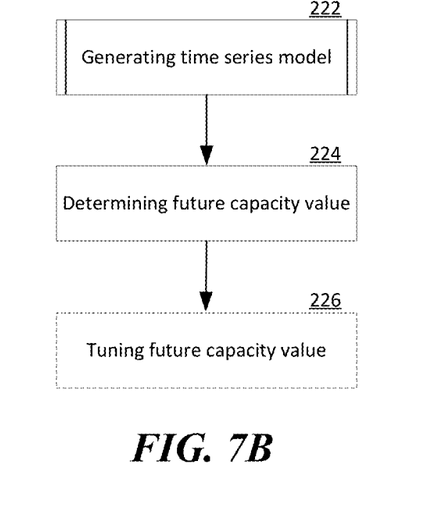
Figure 7C:
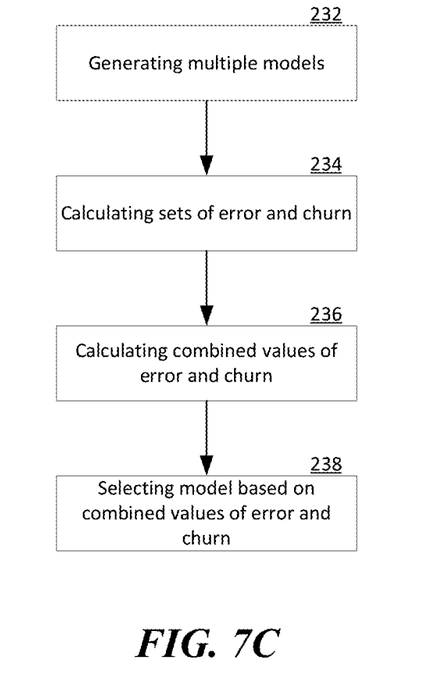

FIGS. 7A-7C are flowcharts illustrating various processes of automated resource provisioning in a distributed computing system in accordance with embodiments of the disclosed technology. Even though aspects of the processes are described below with reference to the distributed computing system 100 of FIGS. 1 and 2, in other embodiments, the processes can also be implemented in other computing systems with different or additional components.

As shown in FIG. 7A, the process 200 can include receiving data of historical usage levels of computing resources from the computing fabric 104 (FIG. 1) at stage 202. The received data can include usage data 160 (FIG. 3), available capacity 162 (FIG. 3), service restrictions 164 (FIG. 3), operation failures 166 (FIG. 3), or other suitable data representing parameters impacting computing resources in the computing fabric 104. The process 200 can then optionally include preprocessing the received data at stage 204. Preprocessing the received data can include, for example, sorting, filtering, or other suitable data operations, examples of which are described above with reference to FIG. 3.

The process 200 can then include predicting a future usage level of computing resources at stage 206. In certain embodiments, predicting a future usage level includes generating a time series model of usage levels associated with the computing resources and predicting a future usage level based on the generated time series model. During generation of the time series model, a combination of an error measurement (e.g., MAPE) and a forecast churn can be used as a factor or criterion for selecting one or more model parameters (e.g., level or slope smoothing factor for exponential smoothing) of the time series model. Example operations for predicting a future capacity are described in more detail below with reference to FIG. 7B. In other embodiments, other suitable model parameters, such as an order (number of time lags) of an autoregressive model, a degree of differencing (the number of times the data have had past values subtracted), and an order of the moving-average model of an autoregressive integrated moving average model can also be selected based on the combination of the error measurement and forecast churn in addition to or in lieu of the level or slope smoothing factor for exponential smoothing.

The process 200 can then optionally include a decision stage 208 to determine whether the predicted future usage level is above a threshold (e.g., a current or future inventory level). In response to determining that the predicted future usage level is above the threshold, the process 200 can include triggering remedial actions, such as allocating and provisioning additional computing resources, at stage 210 before reverting to receiving additional data at stage 202. Example remedial actions are described above with reference to FIG. 3. Otherwise, the process 200 can include recording the predicted usage level at stage 209 before reverting to receiving additional data at stage 202.

FIG. 7B illustrates example operations for predicting a future usage level of computing resources. As shown in FIG. 7B, the operations can include generating a time series model at stage 222 and determining a future usage level based on the generated time series model at stage 224. Example operations of generating the time series model are described below with reference to FIG. 7C. The operations can also optionally include tuning the determined future capacity value based on, for instance, service restrictions, user quotas, capacity reservations, or other suitable information, as described above with reference to FIG. 3.

FIG. 7C illustrates example operations for generating a time series model for predicting a future usage level of computing resources. As shown in FIG. 7C, the operations can include generating multiple time series models by varying one or more model parameters. In one example, the varied model parameters can include one or more of a level or slope smoothing factor when applying exponential smoothing to the received data in FIG. 7A. In other examples, other suitable model parameters can also be varied. The operations can then include calculating sets of error measurements (e.g., MAPE) and forecast churn for each of the generated time series models at stage 234. The operations can further include calculating combined values of the error measurement and forecast churn at stage 236. In certain implementations, the combined values can be a linear combination of the error measurement and forecast churn with or without weighting factors. In other implementations, the combined values can be other suitable types of combinations of the error measurement and forecast churn. The operations can then include selecting a time series model from the generated time series models based on the combined values of the error measurement and forecast churn. In certain implementations, the selected time series model has a combined value of the error measurement and forecast churn that is smallest amongst all the generated time series models. In other implementations, the selected time series model can have a combined value of the error measurement and forecast churn that is not the smallest amongst all the generated time series models based on historical operational failures in the distributed computing system 100 (FIG. 1), service restrictions, and/or other suitable factors.

Figure 8:
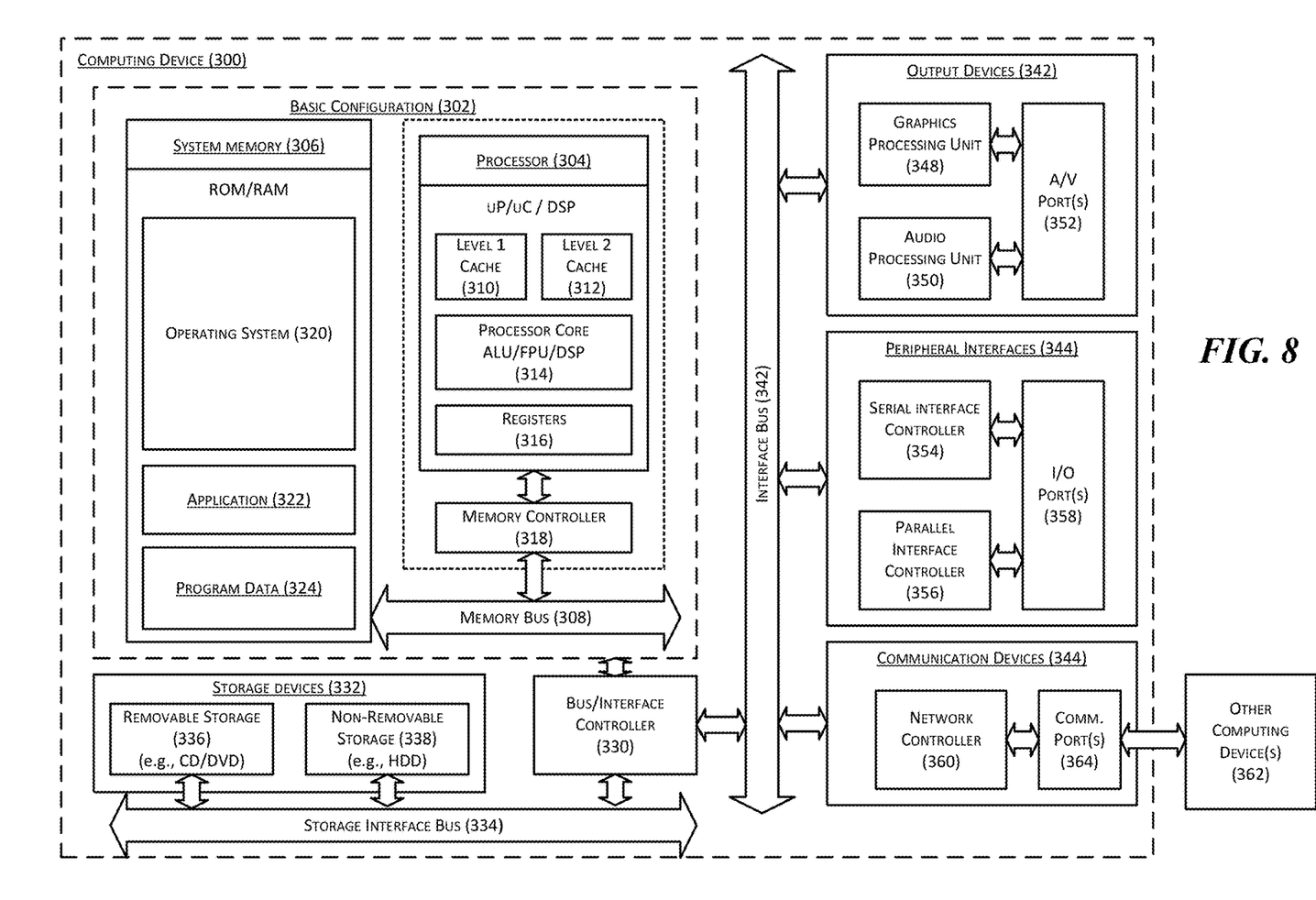
FIG. 8 is a computing device suitable for certain components of the distributed computing system in FIG. 1.

FIG. 8 is a computing device 300 suitable for certain components of the distributed computing system 100 in FIG. 1. For example, the computing device 300 can be suitable for the hosts 106, the management controller 102, the cluster controller 109, or the capacity manager 110 of FIG. 1. In a very basic configuration 302, the computing device 300 can include one or more processors 304 and a system memory 306. A memory bus 308 can be used for communicating between processor 304 and system memory 306.

Depending on the desired configuration, the processor 304 can be of any type including but not limited to a microprocessor (µP), a microcontroller (µC), a digital signal processor (DSP), or any combination thereof. The processor 304 can include one more level of caching, such as a level-one cache 310 and a level-two cache 312, a processor core 314, and registers 316. An example processor core 314 can include an arithmetic logic unit (ALU), a floating-point unit (FPU), a digital signal processing core (DSP Core), or any combination thereof. An example memory controller 318 can also be used with processor 304, or in some implementations, memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. This described basic configuration 302 is illustrated in FIG. 8 by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more A/V ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

From the foregoing, it will be appreciated that specific embodiments of the disclosure have been described herein for purposes of illustration, but that various modifications may be made without deviating from the disclosure. In addition, many of the elements of one embodiment may be combined with other embodiments in addition to or in lieu of the elements of the other embodiments. Accordingly, the technology is not limited except as by the appended claims.

I claim:

1. A method of automated capacity management in a distributed computing system having multiple servers interconnected by a computer network to provide computing resources to remote devices, the method comprising:
   generating a model representing estimated usage levels of a computing resource based on data representing recorded historical usage levels of the computing resource in the distributed computing system according to both:
   an error measurement between the individual historical usage levels and corresponding estimated usage levels specified by the generated model at corresponding time points; and
   a forecast churn representing a difference between a first estimated usage level at a future time point based on a first subset of the historical usage levels and a second estimated usage level at the same future time point based on a second subset of the historical usage levels, the second subset having at least one more historical usage level less than the first subset;
   determining a future usage level of the computing resource in the distributed computing system at the future time point using the generated model; and
   allocating and provisioning an amount of the computing resource in the distributed computing system in accordance with the determined future usage level of the computing resource at the future time point.

2. The method of claim 1 wherein:
generating the model includes generating multiple time series models based on the historical usage levels of the computing resource according to both the error measurement and the forecast churn; and
the generated time series model provides a smallest difference between the first estimated usage level and the second estimated usage level at the future time point than other time series models generated based on the historical usage levels.

3. The method of claim 1 wherein:
generating the model includes generating multiple time series models based on the historical usage levels of the computing resource according to both the error measurement and the forecast churn; and
the generated time series model provides both (i) a smallest error measurement and (ii) a smallest difference between the first estimated usage level and the second estimated usage level at the future time point than other time series models generated based on the historical usage levels.

4. The method of claim 1 wherein:
generating the model includes generating multiple time series models based on the historical usage levels of the computing resource according to both the error measurement and the forecast churn; and
the generated time series model provides a smallest difference between the first estimated usage level and the second estimated usage level at the future time point but not the smallest error measurement than other time series models generated based on the historical usage levels.

5. The method of claim 1 wherein generating the model includes:
generating multiple time series models based on the historical usage levels of the computing resource via exponential smoothing corresponding to multiple sets of a level smoothing factor and a slope smoothing factor; and
selecting, from the multiple generated time series models, the generated time series model that provides a smallest difference between the first estimated usage level and the second estimated usage level at the future time point than other generated ones of the multiple time series models.

6. The method of claim 1 wherein generating the model includes:
generating multiple time series models based on the historical usage levels of the computing resource via exponential smoothing corresponding to multiple sets of a level smoothing factor and a slope smoothing factor; and
selecting, from the multiple generated time series models, the generated time series model that provides:
a smallest error measurement between the individual historical usage levels and corresponding estimated usage levels specified by the generated model at the corresponding time points; and
a smallest difference between the first estimated usage level and the second estimated usage level at the future time point than other generated ones of the multiple time series models.

7. The method of claim 1 wherein generating the model includes:

generating multiple time series models based on the historical usage levels of the computing resource via exponential smoothing corresponding to multiple sets of the level smoothing factor and the slope smoothing factor;
calculating, for each of the generated time series models, a set of corresponding error measurement and forecast churn;
calculating, for each set of the error measurement and forecast churn, a combined value of the error measurement and the forecast churn; and
selecting one of the sets of the level smoothing factor and the slope smoothing factor that corresponds to a minimum combined value of the error measurement and the forecast churn.

8. The method of claim 1 wherein generating the model includes:
generating multiple time series models based on the historical usage levels of the computing resource via exponential smoothing corresponding to multiple sets of the level smoothing factor and the slope smoothing factor;
calculating, for each of the generated time series models, a set of corresponding error measurement and forecast churn;
calculating, for each set of the error measurement and forecast churn, a combined value of the error measurement with an error measurement weight and the forecast churn with a forecast churn weight; and
selecting one of the sets of the level smoothing factor and the slope smoothing factor that corresponds to a minimum combined value of the error measurement and the forecast churn.

9. The method of claim 1 wherein allocating and provisioning the amount of the computing resource includes one or more of:
allocating and provisioning one or more of a virtual machine, container, or load balancer;
allocating additional bandwidth of the computer network;
triggering build-out of additional servers that are configured to provide the computing resource; or
rebalancing a work load associated with the computing resource with one or more additional computing systems.

10. A computing device of automated capacity management, comprising:
a processor; and
a memory operatively coupled to the processor, the memory having instructions executable by the processor to cause the computing device to:
generate a time series model representing estimated usage levels of a computing resource in a computing system based on data representing historical usage levels of the computing resource according to both:
an error measurement between the individual historical usage levels and corresponding estimated usage levels specified by the generated model at corresponding time points; and
a forecast churn representing a difference between a first estimated usage level at a future time point based on a first subset of the historical usage levels and a second estimated usage level at the same future time point based on a second subset of the historical usage levels, the second subset having at least one more historical usage level less than the first subset;

determine a future usage level of the computing resource in the computing system at the future time point using the generated model; and provision an amount of the computing resource in the computing system in accordance with the determined future usage level of the computing resource at the future time point.

11. The computing device of claim 10 wherein to generate the time series model includes to generate multiple time series models based on the historical usage levels, and wherein the generated time series model provides a smallest difference between the first estimated usage level and the second estimated usage level at the future time point than other time series models generated based on the historical usage levels.

12. The computing device of claim 10 wherein to generate the time series model includes to generate multiple time series models based on the historical usage levels, and wherein the generated time series model provides both a smallest error measurement and a smallest difference between the first estimated usage level and the second estimated usage level at the future time point than other time series models generated based on the historical usage levels.

13. The computing device of claim 10 wherein to generate the time series model includes to generate multiple time series models based on the historical usage levels, and wherein the generated time series model provides a smallest difference between the first estimated usage level and the second estimated usage level at the future time point but not the smallest error measurement than other time series models generated based on the historical usage levels.

14. The computing device of claim 10 wherein to generate the time series model includes to:
generate multiple time series models based on the historical usage levels of the computing resource via exponential smoothing corresponding to multiple sets of a level smoothing factor and a slope smoothing factor; and
select, from the multiple generated time series models, the generated time series model that provides a smallest difference between the first estimated usage level and the second estimated usage level at the future time point than other generated ones of the multiple time series models.

15. The computing device of claim 10 wherein to generate the time series model includes to:
generate multiple time series models based on the historical usage levels of the computing resource via exponential smoothing corresponding to multiple sets of a level smoothing factor and a slope smoothing factor; and
select, from the multiple generated time series models, the generated time series model that provides:
a smallest error measurement between the individual historical usage levels and corresponding estimated usage levels specified by the generated model at the corresponding time points; and
a smallest difference between the first estimated usage level and the second estimated usage level at the future time point than other generated ones of the multiple time series models.

16. The computing device of claim 10 wherein to generate the time series model includes to:
generate multiple time series models based on the historical usage levels of the computing resource via exponential smoothing corresponding to multiple sets of the level smoothing factor and the slope smoothing factor;
calculate, for each of the generated time series models, a set of corresponding error measurement and forecast churn;
calculate, for each set of the error measurement and forecast churn, a combined value of the error measurement and the forecast churn; and
select one of the sets of the level smoothing factor and the slope smoothing factor that corresponds to a minimum combined value of the error measurement and the forecast churn.

17. A method of automated capacity management in a computing system that provides a computing resource for access by a user, the method comprising:
generating multiple time series models individually representing estimated usage levels of the computing resource based on data representing historical usage levels of the computing resource;
for each of the generated multiple time series models,
calculating a forecast churn representing a difference between a first estimated usage level at a future time point based on a first subset of the historical usage levels and a second estimated usage level at the same future time point based on a second subset of the historical usage levels, the second subset having at least one more historical usage level less than the first subset;
selecting, from the generated multiple time series models, one of the time series models that has a value of the calculated forecast churn smaller than the other generated time series models;
determining a future usage level of the computing resource in the computing system at the future time point using the selected one of the time series models; and
allocating and provisioning an amount of the computing resource in the computing system in accordance with the determined future usage level of the computing resource at the future time point.

18. The method of claim 17 wherein selecting the one of the time series models includes:
selecting, from the generated multiple time series models, the one of the time series models that has both
the value of the calculated forecast churn; and
an error measurement between the individual historical usage levels and corresponding estimated usage levels specified by the time series model at the corresponding time points smaller than the other generated time series models.

19. The method of claim 17 wherein generating multiple time series models includes generating the multiple time series models based on the historical usage levels of the computing resource via exponential smoothing corresponding to multiple sets of a level smoothing factor and a slope smoothing factor.

20. The method of claim 17 wherein:
generating multiple time series models includes generating the multiple time series models based on the historical usage levels of the computing resource via exponential smoothing corresponding to multiple sets of a level smoothing factor and a slope smoothing factor; and
selecting the one of the time series models includes:
calculating, for each of the generated multiple time series models, a set of corresponding error measurement between the individual historical usage levels and corresponding estimated usage levels specified by the time series model at the corresponding time points and forecast churn;

calculating, for each set of the error measurement and forecast churn, a combined value of the error measurement and the forecast churn; and selecting one of the sets of the level smoothing factor and the slope smoothing factor that corresponds to a minimum combined value of the error measurement and the forecast churn.

* * * * *